United States Patent
Ueno et al.

(10) Patent No.: US 10,249,915 B2
(45) Date of Patent: Apr. 2, 2019

(54) METHOD OF MANUFACTURING NONAQUEOUS SECONDARY BATTERY

(71) Applicant: TOYOTA JIDOSHA KABUSHIKI KAISHA, Toyota-shi, Aichi-ken (JP)

(72) Inventors: Yukiyoshi Ueno, Toyota (JP); Yuuichi Ito, Toyota (JP); Kunimitu Yamamoto, Toyota (JP); Junko Ohira, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 76 days.

(21) Appl. No.: 15/325,325

(22) PCT Filed: Jul. 10, 2015

(86) PCT No.: PCT/IB2015/001162
§ 371 (c)(1),
(2) Date: Jan. 10, 2017

(87) PCT Pub. No.: WO2016/009261
PCT Pub. Date: Jan. 21, 2016

(65) Prior Publication Data
US 2017/0170530 A1   Jun. 15, 2017

(30) Foreign Application Priority Data
Jul. 14, 2014   (JP) .................................. 2014-143968

(51) Int. Cl.
*H01M 10/0566* (2010.01)
*H01M 10/058* (2010.01)
(Continued)

(52) U.S. Cl.
CPC ....... *H01M 10/446* (2013.01); *H01M 10/058* (2013.01); *H01M 10/0566* (2013.01); *H01M 10/0567* (2013.01)

(58) Field of Classification Search
None
See application file for complete search history.

(56) References Cited

U.S. PATENT DOCUMENTS

2012/0141869 A1   6/2012   Takahata

FOREIGN PATENT DOCUMENTS

| JP | 2000-306602 A | 11/2000 |
| JP | 2005108476 A | 4/2005 |

(Continued)

OTHER PUBLICATIONS

Partial Translation of Communication dated Aug. 17, 2017 from the Japanese Patent Office in counterpart Japanese application No. 2014-143968.

(Continued)

*Primary Examiner* — Sarah A. Slifka
*Assistant Examiner* — Haroon S. Sheikh
(74) *Attorney, Agent, or Firm* — Sughrue Mion, PLLC (57) ABSTRACT

A method of manufacturing a nonaqueous secondary battery includes: constructing a battery assembly with a positive electrode, a negative electrode, and a nonaqueous electrolytic solution, the nonaqueous electrolytic solution containing an unsaturated carbonate; activating the battery assembly to decompose a portion of the unsaturated carbonate such that a percentage of the unsaturated carbonate is adjusted to be 0.9 mass % or less with respect to 100 mass % of a total amount of the nonaqueous electrolytic solution; self-discharging the battery assembly to measure a voltage drop amount; and determining whether internal short-circuit occurs in the battery assembly based on the voltage drop amount.

6 Claims, 5 Drawing Sheets

(51) Int. Cl.
*H01M 10/44* (2006.01)
*H01M 10/0567* (2010.01)

(56) References Cited

FOREIGN PATENT DOCUMENTS

| JP | 2005-251538 A | 9/2005 |
| JP | 2012-160435 A | 8/2012 |
| JP | 2013-114986 A | 6/2013 |
| JP | 2016-021300 A | 2/2016 |
| WO | 2012043733 A1 | 4/2012 |
| WO | 2015/068013 A1 | 5/2015 |
| WO | 2016/009263 A1 | 1/2016 |

OTHER PUBLICATIONS

Zhang et al: "A review on electrolyte additives for lithium-ion batteries", Journal of Power Sources, Elsevier SA, CH, vol. 162, No. 2, Nov. 22, 2006 (Nov. 22, 2006), pp. 1379-1394, XP027938606, ISSN: 0378-7753 [retrieved on Nov. 22, 2006] section 2.2.

METHOD OF MANUFACTURING NONAQUEOUS SECONDARY BATTERY

CROSS REFERENCE TO RELATED APPLICATIONS

This application is a National Stage of International Application No. PCT/IB2015/001162 filed Jul. 10, 2015, claiming priority based on Japanese Patent Application No. 2014-143968 filed Jul. 14, 2014, the contents of all of which are incorporated herein by reference in their entirety.

BACKGROUND OF THE INVENTION

1. Field of the Invention

The present invention relates to a method of manufacturing a battery (nonaqueous secondary battery) including a nonaqueous electrolytic solution.

2. Description of Related Art

During the manufacture of a nonaqueous secondary battery such as a lithium ion secondary battery, for example, a battery assembly is constructed using a positive electrode, a negative electrode, and a nonaqueous electrolytic solution. Next, this battery assembly undergoes treatments such as initial charging (conditioning), keeping at a high temperature range (aging), and quality inspection. For example, Japanese Patent Application Publication No. 2005-251538 (JP 2005-251538 A) discloses a self-discharge test method of a secondary battery, the method including: charging a constructed battery assembly to a predetermined voltage; leaving the battery assembly to stand for a predetermined period; and determining whether internal short-circuit occurs based on a voltage change amount between voltage values before and after the standing (voltage drop amount).

However, in a nonaqueous secondary battery, a nonaqueous electrolytic solution may contain additives to improve durability. For example, when a so-called film forming agent (for example, an unsaturated carbonate) is added during the construction of a battery assembly, the compound is decomposed, typically, during initial charging to form a film (protective film) on a surface of an electrode (for example, a negative electrode). This film stabilizes an interface between the electrode and the nonaqueous electrolytic solution and improves the durability (for example, cycle characteristics or high-temperature storage characteristics) of the battery. However, according to a new finding obtained by the present inventors, when a nonaqueous electrolytic solution contains an unsaturated carbonate, the above-described self-discharge test may be delayed. Accordingly, from the viewpoints of productivity, working efficiency, and cost, it is required to reduce a self-discharge test period without decreasing test accuracy even when a nonaqueous electrolytic solution contains the unsaturated carbonate.

SUMMARY OF THE INVENTION

The invention has been made in consideration of the above-described circumstances. The present invention provides a method of manufacturing a nonaqueous secondary battery containing an unsaturated carbonate during battery construction.

An aspect of the invention is a method of manufacturing a nonaqueous secondary battery, the method including: constructing a battery assembly with a positive electrode, a negative electrode, and a nonaqueous electrolytic solution, the nonaqueous electrolytic solution containing an unsaturated carbonate; activating the battery assembly to decompose a portion of the unsaturated carbonate such that a percentage of the unsaturated carbonate is adjusted to be 0.9 mass % or less with respect to 100 mass % of a total amount of the nonaqueous electrolytic solution; self-discharging the battery assembly to measure a voltage drop amount; and determining whether internal short-circuit occurs in the battery assembly based on the voltage drop amount.

By adjusting the percentage of the unsaturated carbonate in the nonaqueous electrolytic solution before the self-discharge test to be 0.9 mass % or less, the current consumption of a battery assembly having "no internal short-circuit" (hereinafter, also referred to as "good product") during the self-discharge test can be reduced. Thus, the voltage drop amount of the good product can be further reduced. As a result, a difference in the voltage drop amount between a good product group and a battery assembly having internal short-circuit (hereinafter, also referred to as "bad product") increases, and whether internal short-circuit occurs in a battery is easy to be determined. Accordingly, the time required for the self-discharge test can be reduced while maintaining the test accuracy. That is, by using the method according to the aspect of the invention, even when a nonaqueous electrolytic solution contains an unsaturated carbonate, a highly reliable battery can be manufactured within a short period of time.

In the aspect of the invention, the percentage of the unsaturated carbonate in the nonaqueous electrolytic solution may be adjusted to be 0.7 mass % or more by the activating. As a result, the time and cost (process load) required for the activating can be suppressed to be low. Accordingly, from the viewpoints of productivity, working efficiency, and cost, a method having a good total balance can be provided.

Furthermore, the percentage of the unsaturated carbonate in the nonaqueous electrolytic solution may be adjusted to be 0.8 mass % or more by the activating.

In the aspect of the invention, the activating may include conditioning in which the battery assembly is initially charged, and aging in which the battery assembly is kept in a temperature environment of 40° C. or higher. The aging may include adjusting the percentage of the unsaturated carbonate in the nonaqueous electrolytic solution by controlling a time to keep the battery assembly in the temperature environment. The percentage of the unsaturated carbonate in the nonaqueous electrolytic solution is adjusted by controlling the keeping time (aging time) of the aging step. According to the finding of the present inventors, a correlation is established between the keeping time of the aging step (hereinafter, also referred to as "high-temperature aging step") and the percentage of the unsaturated carbonate remaining in the nonaqueous electrolytic solution. That is, as the aging time increases, the amount of the unsaturated carbonate consumed to form a film increases, and thus the percentage of the unsaturated carbonate in the nonaqueous electrolytic solution decreases. Accordingly, the percentage of the unsaturated carbonate in the nonaqueous electrolytic solution can be accurately adjusted by controlling the aging time.

In the aspect of the invention, the nonaqueous electrolytic solution that is used in the constructing may contain 1 mass % or more of the unsaturated carbonate. By the nonaqueous electrolytic solution containing 1 mass % or more of the unsaturated carbonate with respect to the total amount thereof, a solid electrolyte interface film (SEI film) including a component derived from the unsaturated carbonate can be appropriately formed on a surface of a negative electrode. Accordingly, a nonaqueous battery having superior durability can be manufactured.

In the aspect of the invention, the unsaturated carbonate may include at least a vinylene carbonate compound (specifically, for example, vinylene carbonate).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 2A:
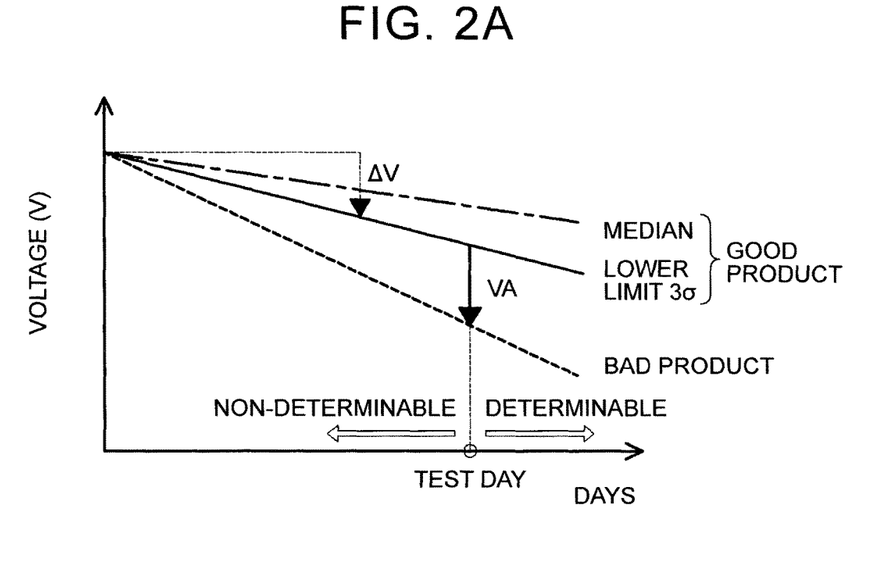
FIG. 2A is a diagram showing a general method of determining whether a product is good or bad.

Initially, an example of a method of determining whether internal short-circuit occurs based on the result of a voltage drop amount, and the details of how to complete the invention will be described. In order to determine whether internal short-circuit occurs (whether a product is good or bad) based on the result of the voltage drop amount, it is necessary to set a reference value for quality determination. A difference between the reference value and the voltage drop amount of each battery assembly is calculated. When this difference is a predetermined threshold value or lower, this battery assembly is determined as "no internal short-circuit" (that is, a good product). When this difference exceeds the predetermined threshold value, this battery assembly is determined as "internal short-circuit occurred" (that is, a bad product). As an example, FIG. 2A shows a general method of determining whether a product is good or bad. In FIG. 2A, a median of the voltage drop amounts $\Delta V$ of plural batteries is adopted as the reference value for quality determination, and the threshold value of a good product group is set as $3\sigma$ ($\sigma$ refers to a standard deviation; hereinafter, the same shall be applied). In order to accurately determine whether a product is good or bad within a short period of time, it is necessary that the voltage drop amount $\Delta V$ (here, the median of a good product group+ the lower limit $3\sigma$) of a good product group be small and the voltage drop amount of a bad product be sufficiently large. In FIG. 2A, a day when the voltage drop amount $\Delta V$ of a bad product is sufficiently larger than the voltage drop amount $\Delta V$ of a good product group (when the voltage drop amount is VA) is set as a test day.

According to the finding of the present inventors, the voltage drop amount $\Delta V$ during self-discharge is determined depending on "resistance value at a voltage of a battery" and "current consumption value". In a self-discharge test, the battery voltages of a good product and a bad product are the same, and the resistance values thereof are the same. Therefore, during the determination of whether a product is good or bad, it is important to further decrease the current consumption of a good product group or to further increase the current consumption of a bad product. It is considered that the current consumption of a bad product corresponds to the sum of "current consumed by a film forming reaction on a surface of an electrode (for example, a negative electrode)" and "current consumed at an internal short-circuit position"; whereas, the current consumption of a good product corresponds to only the former current value. Therefore, the present inventors thought that, by suppressing the formation of a film during a self-discharge test period, the voltage drop amount $\Delta V$ of a good product is reduced, and $3\sigma$ of the voltage drop amount $\Delta V$ of a good product group is reduced (a variation is reduced). As a result of a thorough study, the present invention has been completed.

Hereinafter, a preferred embodiment of the invention will be described appropriately with reference to the drawings. Matters necessary to implement the secondary battery other than those specifically referred to in this description may be understood as design matters based on the related art in the pertinent field for a person of ordinary skills in the art. The embodiment of the invention can be practiced based on the contents disclosed in this description and common technical knowledge in the subject field.

Method of Manufacturing Nonaqueous Secondary Battery

Figure 1:
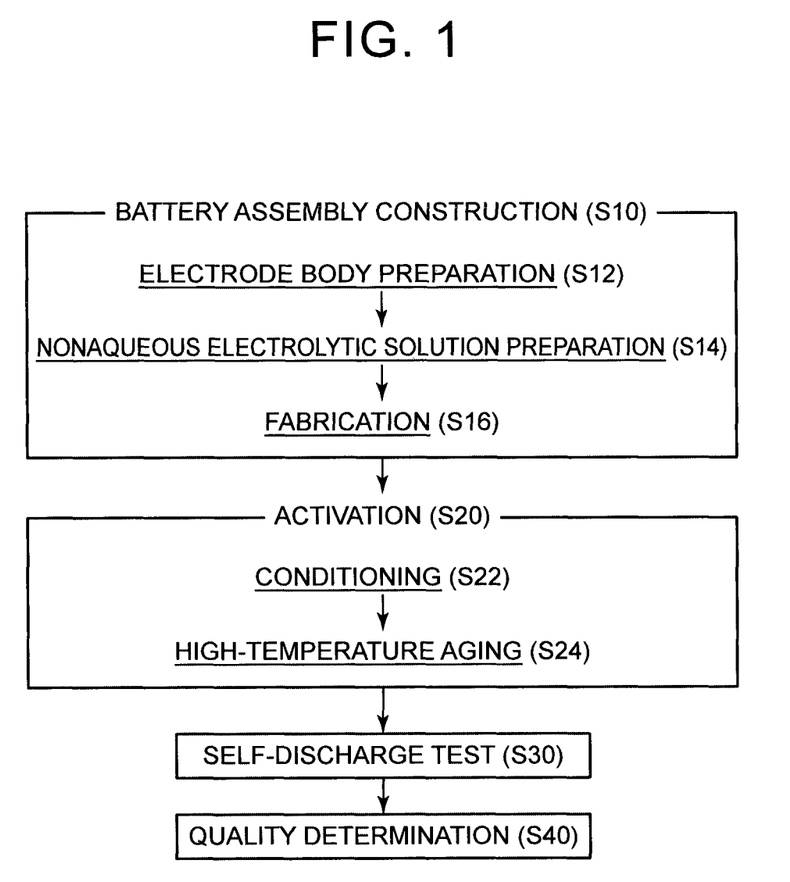
FIG. 1 is a flowchart showing a method of manufacturing a nonaqueous secondary battery according to an embodiment of the invention.

A method of manufacturing a nonaqueous secondary battery according to the embodiment includes: battery assembly construction S10; activation S20; a self-discharge test S30; and quality determination S40. FIG. 1 is a flowchart showing the method according to the embodiment of the invention. Hereinafter, the respective steps will be sequentially described with reference to FIG. 1. In this specification, "ordinary temperature range" refers to 20° C.±10° C. (typically, 15° C. to 30° C., for example, 20° C. to 25° C.)

In the battery assembly construction S10, typically in the ordinary temperature range, a battery assembly is constructed using a positive electrode, a negative electrode, and a nonaqueous electrolytic solution containing an unsaturated carbonate. In the aspect shown in FIG. 1, this step includes three steps of: electrode body preparation S12; nonaqueous electrolytic solution preparation S14; and battery assembly fabrication S16.

In the electrode body preparation S12, an electrode body including a positive electrode and a negative electrode is prepared. The electrode body can be prepared, for example, by laminating the positive electrode and the negative electrode to be opposite each other with a separator interposed therebetween.

Typically, a positive electrode active material layer containing a positive electrode active material is fixed onto a positive electrode current collector. As the positive electrode current collector, a conductive member formed of highly conductive metal (for example, aluminum or nickel) can be preferably used. As the positive electrode active material, one kind or two or more kinds can be used among various known materials which can be used as a positive electrode active material of a nonaqueous secondary battery. Preferable examples of the positive electrode active material include layered or spinel type lithium composite metal oxides (for example, $LiNiO_2$, $LiCoO_2$, $LiFeO_2$, $LiMn_2O_4$, $LiNi_{0.33}Co_{0.33}Mn_{0.33}O_2$, $LiNi_{0.5}Mn_{1.5}O_4$, and $LiFePO_4$). Among these, a lithium nickel cobalt manganese composite oxide having a layered structure (typically, a layered rocksalt type structure) which contains Li, Ni, Co, and Mn as constituent elements can be preferably used from the viewpoints of heat stability and energy density.

In addition to the positive electrode active material, the positive electrode active material layer may optionally contain one material or two or more materials which can be used as components of a positive electrode active material layer in a general nonaqueous secondary battery. Examples of the material include a conductive material and a binder. As the conductive material, for example, carbon materials such as various carbon blacks (for example, acetylene black and Ketjen black), activated carbon, graphite, and carbon fiber can be preferably used. In addition, as the binder, for example, polyvinylidene fluoride (PVdF) or polyethylene oxide (PEO) can be preferably used. In addition, the positive electrode active material layer may further contain various additives (for example, an inorganic compound that produces gas during overcharge, a dispersant, or a thickener) within a range where the effects of the embodiment of the invention do not significantly deteriorate.

Typically, a negative electrode active material layer containing a negative electrode active material is fixed onto a negative electrode current collector. As the negative electrode current collector, a conductive member formed of highly conductive metal (for example, copper or nickel) can be preferably used. As the negative electrode active material, one kind or two or more kinds can be used among various known materials which can be used as a negative electrode active material of a nonaqueous secondary battery. Preferable examples of the negative electrode active material include various carbon materials such as graphite, non-graphitizable carbon (hard carbon), graphitizable carbon (soft carbon), and carbon nanotube.

In addition to the negative electrode active material, the negative electrode active material layer may optionally contain one material or two or more materials which can be used as components of a negative electrode active material layer in a general nonaqueous secondary battery. Examples of the material include a binder. As the binder, for example, styrene-butadiene rubber (SBR), polyvinylidene fluoride (PVdF), and polytetrafluoroethylene (PTFE) can be preferably used. In addition, the negative electrode active material layer may further contain various additives (for example, a thickener, a dispersant, or a conductive material) within a range where the effects of the embodiment of the invention do not significantly deteriorate. For example, as the thickener, carboxymethyl cellulose (CMC) or methyl cellulose (MC) can be preferably used.

Although not particularly limited, a capacity ratio ($C_N/C_P$) may be adjusted to be, for example, 1.01 to 1.6 during the construction of an electrode body, the capacity ratio being calculated as an initial capacity ratio of the positive and negative electrodes, that is a ratio of the initial charging capacity ($C_N$) of the negative electrode to the initial charging capacity ($C_P$) of the positive electrode. In the above-described range, the deposition of metal on the negative electrode can be accurately prevented, and superior durability can be realized.

As the separator, the same kind of a porous sheet, non-woven fabric, and the like as those used in a general nonaqueous secondary battery can be used. Preferable examples of the separator include a porous resin sheet formed of a resin such as polyethylene (PE), polypropylene (PP), or polyester. In addition, the separator may be configured as a heat-resistant separator including: a resin substrate that is formed of the above-described porous sheet; and a porous heat resistance layer that is formed on a single surface or both surfaces (typically, a single surface) of the resin substrate. The porous heat resistance layer may be a layer containing, for example, an inorganic material (for example, inorganic fillers such as alumina particles) and a binder, or a layer containing insulating resin particles (for examples, particles of polyethylene or polypropylene).

In the nonaqueous electrolytic solution preparation S14, a nonaqueous electrolytic solution containing an unsaturated carbonate is prepared. The nonaqueous electrolytic solution may be prepared, for example, by dissolving or dispersing a supporting electrolyte and the unsaturated carbonate in a nonaqueous solvent.

The nonaqueous solvent is not particularly limited. As the nonaqueous solvent, various organic solvents which can be used in a nonaqueous solvent of a general nonaqueous secondary battery, for example, carbonates, ethers, esters, nitriles, sulfones, and lactones can be used. Among these, saturated carbonates (in particular, saturated cyclic carbonates) can be preferably used from the viewpoint of forming a high-quality film on a surface of the negative electrode. Preferable examples of the nonaqueous solvent include ethylene carbonate (EC), propylene carbonate (PC), diethyl carbonate (DEC), dimethyl carbonate (DMC), and ethyl methyl carbonate (EMC). The supporting electrolyte is not particularly limited as long as it contains charge carriers (for example, lithium ions, sodium ions, or magnesium ions; in a lithium ion secondary battery, lithium ions) and can be appropriately selected from among those which can be used in a general nonaqueous secondary battery. For example, when lithium ions are used as the charge carriers, examples of the supporting electrolyte include lithium salts such as $LiPF_6$, $LiBF_4$, and $LiClO_4$. Among these, $LiPF_6$ can be preferably used.

The unsaturated carbonate is not particularly limited as long as it is a carbonate having an unsaturated bond between carbon-carbon bonds (C—C), and can be appropriately selected from carbonates which can be used as a so-called film forming agent in a nonaqueous electrolytic solution of a general nonaqueous secondary battery. For example, a carbonate having a carbon-carbon double bond, a carbonate having a carbon-carbon triple bond, or a carbonate having an aromatic ring may be used. Specific examples of the unsaturated carbonate include a vinylene carbonate compound, a phenylene carbonate compound, and a vinyl carbonate compound. Among these, a unsaturated cyclic carbonate represented by the following Formula (I), that is, a vinylene carbonate compound having an ethylenically unsaturated bond can be preferably used. The compound is reduced on the negative electrode at a relatively low potential (for example, 3.8 V to 4 V (vs. Li/Li+)). Therefore, a low-resistance stable film can be formed on the surface of the negative electrode. As a result, a nonaqueous secondary battery having superior durability can be suitably formed. Accordingly, the effects of the embodiment of the invention can be exhibited at a higher level.

(I)

However, in Formula (I), $R^1$ and $R^2$ each independently represent a hydrogen atom; or an alkyl group having 1 to 4 carbon atoms such as a methyl group, an ethyl group, a propyl group, or a butyl group.

Specific examples of the vinylene carbonate compound represented by Formula (I) include vinylene carbonate, methyl vinylene carbonate, ethyl vinylene carbonate, dimethyl vinylene carbonate, ethyl methyl vinylene carbonate, diethyl vinylene carbonate, propyl vinylene carbonate, and butyl vinylene carbonate. In a preferred embodiment, all of $R^1$ to $R^2$ in Formula (I) represent a hydrogen atom. That is, the vinylene carbonate compound is vinylene carbonate.

During battery construction, a percentage of the unsaturated carbonate in the nonaqueous electrolytic solution may be determined depending on, for example, the kind and properties (for example, average particle size or specific surface area) of an active material and the porosity of an active material layer without any particular limitation. As shown in Examples described later, the percentage of the unsaturated carbonate in the nonaqueous electrolytic solution is about 0.8 mass % or more (preferably 1 mass % or more) with respect to 100 mass % of the total amount of the nonaqueous electrolytic solution from the viewpoint of forming a sufficient film on the surface of the negative electrode. By the negative electrode being coated with a sufficient film, the reductive decomposition of the nonaqueous electrolytic solution can be suppressed efficiently, and the durability of the battery can be improved. However, in the technique disclosed herein, the self-discharge test is performed after adjusting the percentage of the unsaturated carbonate in the nonaqueous electrolytic solution to be in the predetermined range. Therefore, when the nonaqueous electrolytic solution contains an excess amount of the unsaturated carbonate during battery construction, a relatively long period of time (for example, high-temperature aging step described below) may be required to adjust the percentage of the unsaturated carbonate. In addition, when an excessive film is formed on the negative electrode, the film may function as a resistance component of a cell reaction. From these points of view, the upper limit of the percentage of the unsaturated carbonate with respect to 100 mass % of the total amount of the nonaqueous electrolytic solution is typically 5 mass % or less, preferably 3 mass % or less, and more preferably 2 mass % or less (for example, 1.5 mass % or less).

The nonaqueous electrolytic solution used in herein may further contain optional components in addition to the above-described nonaqueous solvent, supporting electrolyte, and unsaturated carbonate within a range where the effects of the embodiment of the invention do not significantly deteriorate. These optional components are used for one or two or more of the purposes including: improvement of the storability of the battery; improvement of cycle characteristics; improvement of an initial charge-discharge efficiency; improvement of input and output performance; and an increase in the amount of gas produced during overcharge. Examples of the optional components include a film forming agent such as lithium bis(oxalato)borate (LiBOB) or 2-butyne-1,4-diol dimethanesulfonate; and a gas producing agent such as cyclohexylbenzene (CHB) or biphenyl (BP).

In the battery assembly fabrication S16, the electrode body and the nonaqueous electrolytic solution prepared as above are accommodated in a battery case. The battery case is preferably formed of, for example, a light metal material such as aluminum or steel. In this specification, "battery assembly" refers to an assembly which is fabricated using the above-described electrode body and nonaqueous electrolytic solution before the activation step, and the kind, configuration, and the like of the battery are not particularly limited. For example, the battery case may be covered with a lid before or after sealing.

In the activation S20, the battery assembly is activated to decompose a portion of the nonaqueous electrolytic solution. Typically, a portion of the unsaturated carbonate is reduced and decomposed on the negative electrode. As a result, the percentage of the unsaturated carbonate in the nonaqueous electrolytic solution is adjusted to be in the predetermined range while forming a film derived from the nonaqueous electrolytic solution (typically derived from the unsaturated carbonate) is formed on the surface of the negative electrode. Due to the film, an interface between the negative electrode and the nonaqueous electrolytic solution is stabilized, and the decomposition of the nonaqueous electrolytic solution during the next charge and discharge can be suppressed. In the embodiment shown in FIG. 1, this step includes two steps of: conditioning S22; and high-temperature aging S24.

In the conditioning S22, typically in the ordinary temperature range, the battery assembly constructed as above is charged (initially charged) at least once. As a result, the unsaturated carbonate can be decomposed, and the percentage of the unsaturated carbonate in the nonaqueous electrolytic solution can be reduced. In general, an external power supply is connected between the positive electrode (positive electrode terminal) and the negative electrode (negative electrode terminal) of the battery assembly, and the battery assembly is charged (typically charged at a constant current) to a predetermined voltage.

The achieved voltage (typically, maximum achieved voltage) during the conditioning S22 is not particularly limited because it depends on, for example, the kinds of the active material, the nonaqueous solvent, and the unsaturated carbonate to be used. Typically, the potential of the negative electrode may be adjusted to be higher than the reduction decomposition potential of the unsaturated carbonate to be used. In a preferred example, the potential of the negative electrode may be adjusted to be in a voltage range where the state of charge (SOC) of the battery assembly is 65% to 110% (typically, 80% to 110%, for example, 80% to 105%). For example, when a battery is fully charged at 4.2 V, the voltage between the positive and negative electrodes may be set to be 3.8 V to 4.3 V (preferably 3.95 V to 4.1 V).

In addition, a charging method is not particularly limited. For example, a method (CC charging) of charging the battery to the voltage at a constant current, or a method (CCCV charging) of charging the battery to the voltage at a constant current and then charging the battery at a constant voltage may be used. The CC charging rate is not particularly limited. When the CC charging rate is excessively low, the processing efficiency (working efficiency) is likely to decrease. On the other hand, when the CC charging rate is excessively high, the durability of the battery may decrease due to insufficient denseness of a film to be formed. From this point of view, the charging rate may be set to be about 0.1 C to 5 C (for example, 0.5 C to 2 C). As a result, a high-quality (highly dense and low-resistant) film can be formed on the surface of the negative electrode within a short period of time. The charging may be performed once or may be performed two times or more, for example, while performing discharging therebetween. In addition, within a range not impairing battery characteristics, other operations (for example, pressure application or ultrasonic irradiation) may be appropriately performed to promote the reduction decomposition of the nonaqueous electrolytic solution.

In the high-temperature aging S24, after the conditioning S22, the battery assembly is heated to a high temperature range of 40° C. or higher and is kept (left to stand) in the temperature environment for a predetermined amount of time. As means for heating and keeping the battery assembly, for example, a temperature-controlled thermostatic chamber or an infrared heater can be used. In the high-temperature aging S24, the unsaturated carbonate can be further decomposed after the conditioning S22. Therefore, the percentage of the unsaturated carbonate in the nonaqueous electrolytic solution can be accurately controlled to be in the predetermined range. In addition, the high-temperature aging S24 also has an effect of modifying the film formed on the surface of the negative electrode to be improved (that is, to reduce the resistance and to sufficiently suppress a reaction with the nonaqueous electrolytic solution). Further, due to the high-temperature aging S24, for example, even when metal foreign matter (for example, Fe powder or Cu powder) is incorporated from outside (typically, a constituent member of a manufacturing apparatus), the foreign metal can be dissolved and dispersed as a metal ion (for example, a Fe ion or a Cu ion). Therefore, the occurrence of small internal short-circuit in the battery can be prevented.

In a preferred embodiment, the keeping temperature in the high-temperature aging S24 is set to be 50° C. or higher (preferably 55° C. or higher). As a result, the decomposition reaction of the unsaturated carbonate suitably progresses. Therefore, the percentage of the unsaturated carbonate in the nonaqueous electrolytic solution can be controlled to be in the above-described range within a relatively short period of time. In the high-temperature aging S24, the battery assembly is kept in the high-temperature range, and thus the process load is high. Accordingly, the completion of the high-temperature aging S24 within a short period of time is particularly preferable from the viewpoints of improvement of productivity and working efficiency, and cost. The upper limit of the keeping temperature may be set to be typically 80° C. or lower (for example, 70° C. or lower, and preferably 65° C. or lower) from the viewpoint of preventing the deterioration of the battery.

Figure 3:
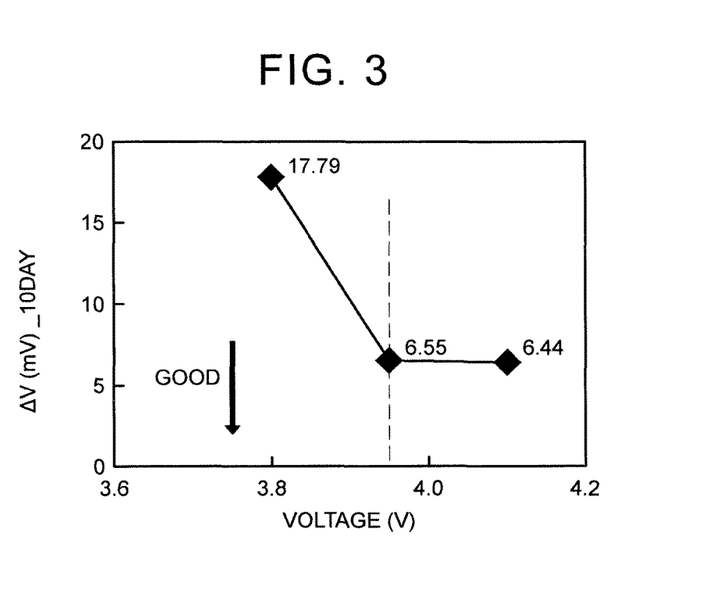
FIG. 3 is a graph showing a relationship between a voltage during aging and a voltage drop amount $\Delta V$ of a good product during a self-discharge test.

In a preferred embodiment, during the entire period of the high-temperature aging S24, the voltage between the terminals adjusted in the conditioning S22 or the equivalent voltage thereof (for example, about ±0.5 V) is kept. The voltage is kept using voltage retention means such as a charging-discharging device (CCCV charging). The present inventors constructed a battery having a full charge voltage of 4.2 V, and FIG. 3 shows the results of investigating a relationship between the retained voltage during the high-temperature aging S24 and the voltage drop amount $\Delta V$ of a good product during a self-discharge test period. (10 days) described below. In FIG. 3, the keeping temperature is fixed at 60° C., and the keeping time is fixed to 17 hours to verify the dependence of the retained voltage. According to FIG. 3, the percentage of the unsaturated carbonate in the nonaqueous electrolytic solution can be efficiently reduced by retaining the voltage between the positive and negative electrodes at 3.8 V to 4.2 V (preferably 3.95 V to 4.1 V) during the entire period of the high-temperature aging S24.

Figure 4:
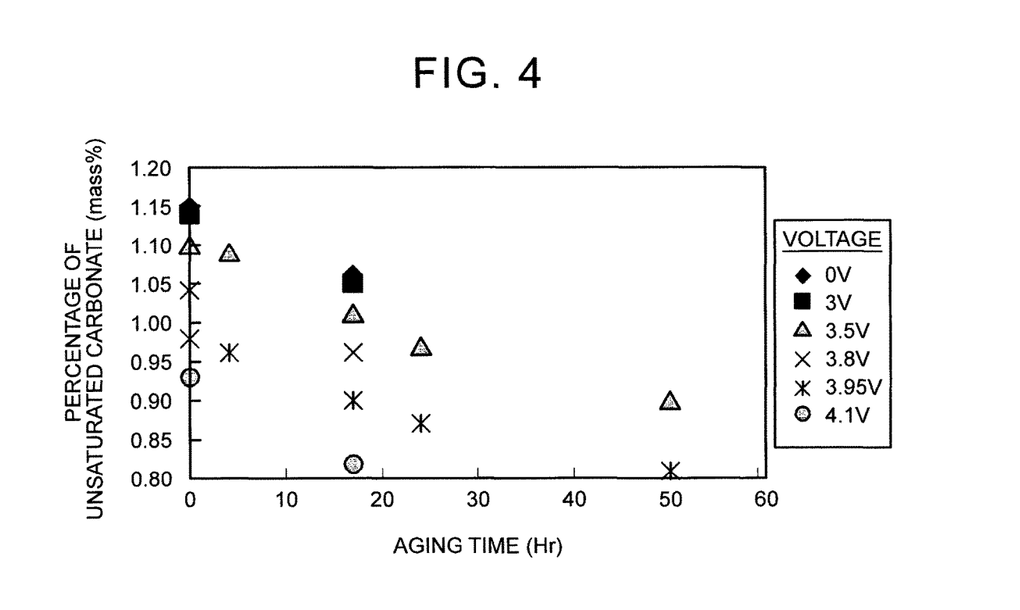
FIG. 4 is a graph showing a relationship between an aging time and a percentage of an unsaturated carbonate in a nonaqueous electrolytic solution.

The keeping time (hereinafter, also referred to as "aging time" or "high-temperature aging time") of the battery assembly in the high temperature range is not particularly limited because it depends on, for example, the keeping temperature, the retained voltage, and the configuration of the nonaqueous electrolytic solution (for example, the content of the unsaturated carbonate during battery construction). For example, as the aging time, the total time from the start of the temperature increase may be set to be about 4 hours to 100 hours (for example, 10 hours to 50 hours). The present inventors constructed a battery having a full charge voltage of 4.2 V, and FIG. 4 shows the results of investigating a relationship between the time required in the high-temperature aging S24 and the percentage of the unsaturated carbonate remaining in the nonaqueous electrolytic solution. In FIG. 4, the keeping temperature is fixed at 60° C. to verify the dependence of the retained voltage and the keeping time (high-temperature aging time). According to FIG. 4, a negative proportional relationship (linear relationship) is established between the high-temperature aging time and the percentage of the unsaturated carbonate remaining in the nonaqueous electrolytic solution. As the high-temperature aging time increases, the percentage of the unsaturated carbonate is likely to decrease. As the retained voltage increases, the high-temperature aging time is likely to decrease. It can be said from the above results that the percentage of the unsaturated carbonate in the nonaqueous electrolytic solution can be accurately controlled to be in the predetermined range by balancing the keeping conditions of the high-temperature aging S24, for example, the keeping temperature, the retained voltage, and the keeping time. Further, the productivity and the working efficiency can be improved, and the cost can be reduced.

Through the above-described steps, the percentage of the unsaturated carbonate remaining in the nonaqueous electrolytic solution after the activation step S20 is adjusted to be 0.9 mass % or less (for example, 0.5 mass % to 0.9 mass %, preferably 0.7 mass % to 0.9 mass %, and more preferably 0.8 mass % to 0.9 mass %). As a result, from the viewpoints of productivity, working efficiency, and cost, a method having a good total balance can be provided. The percentage of the unsaturated carbonate can be measured using a general gas chromatography-mass spectrometer (GC-MS). Specific measurement conditions will be shown in Examples described later.

Figure 2B:
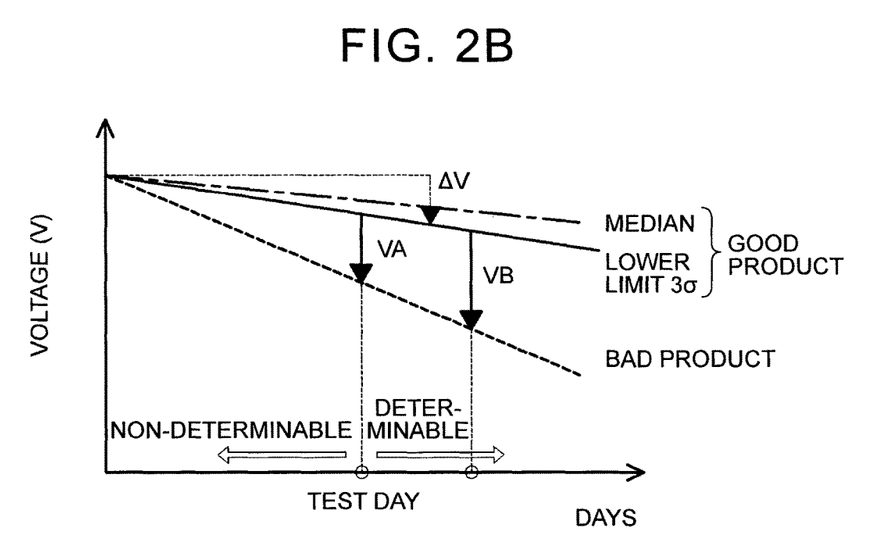
FIG. 2B is a diagram showing a method of determining whether a product is good or bad according to an embodiment of the invention.

In the self-discharge test S30, typically in the ordinary temperature range, the battery assembly in which the percentage of the unsaturated carbonate is adjusted is self-discharged by being left to stand, and the voltage drop amount $\Delta V$ between voltage values before and after the standing is measured. As a result, whether internal short-circuit occurs due to some factors derived from manufacturing conditions and the like can be accurately evaluated and determined. That is, when a battery in which internal short-circuit occurs is left to stand during a certain period, the current consumption increases due to self-discharging, and thus the voltage drop amount increases. Therefore, whether internal short-circuit occurs in the battery can be determined based on the voltage drop amount. FIG. 2B is a diagram showing a method of determining whether a product is good or bad according to an embodiment of the invention. That is, according to the technique disclosed in the embodiment, the absolute value of the voltage drop amount $\Delta V$ of a good product can be reduced, and the slope of a line indicating the median of a good product group shown in FIG. 2B can be made to be gentle. Thus, 3σ (variation) derived from the median of the good product group can be suppressed to be low. As a result, a difference in voltage drop amount between the good product group and a bad product is more increased, and whether internal short-circuit occurs in a battery is easy to be determined. In other words, a difference between the good product and the bad product can be reflected on the voltage drop amount in an early stage, and the time required in the self-discharge test can be reduced as compared to that of the related art. That is, the productivity and the working efficiency can be significantly improved while maintaining the test accuracy. For example, in a high-capacity battery, in the related art, about 10 days is required in the self-discharge test; whereas, according to the technique disclosed in the embodiment, about 5 days is required, and the required time can be substantially halved. Alternatively, when the time of the self-discharge test is the same as that of the related art, quality determination can be performed with higher accuracy by increasing the voltage drop amount to be larger than VA (to be VB) in FIG. 2B.

In the quality determination S40, whether the battery assembly is "internal short-circuit occurred" or "no internal short-circuit" is determined based on the results obtained in the self-discharge test S30. Specifically, first a reference value for quality determination is set based on the measurement results of the voltage drop amount. A method of setting the reference value is not particularly limited. For example, an arithmetic mean value or a median value of voltage drop amounts of plural battery assemblies may be adopted as the reference value. Next, a difference between the reference value and the voltage drop amount of each battery assembly is calculated. When this difference is a predetermined threshold value or lower, this battery assembly is determined as "no internal short-circuit". When this difference exceeds the predetermined threshold value, this battery assembly is determined as "internal short-circuit occurred". The threshold value is not particularly limited because it depends on the standard of a target battery and the like. For example, the threshold value may be set to be a value corresponding to about 2σ to 4σ. A battery assembly which is determined as "internal short-circuit occurred" based on the above determination result is removed. As a result, a bad product is prevented from proceeding to the next step, and a highly reliable battery can be provided.

As described above, according to the technique disclosed in the embodiment, a highly reliable battery can be manufactured within a shorter period of time. In particular, a high-capacity nonaqueous secondary battery has a problem in that the self-discharge test period increases. That is, in a high-capacity battery, a voltage drop derived from internal short-circuit is more difficult to determine as compared to a low-capacity battery. Therefore, it is difficult to determine whether a product is good or bad within a short period of time. As a result, in order to accurately perform the determination, there is a problem in that the self-discharge test period increases. Accordingly, the embodiment of the invention is particularly useful for manufacturing a high-capacity nonaqueous secondary battery, especially having a theoretical capacity of 10 Ah or higher (in particular, 20 Ah or higher). For example, such high-capacity nonaqueous secondary battery has a capacity of 100 Ah or lower.

A battery assembly which is determined as "no internal short-circuit (good product)" in the quality determination S40 is shipped typically after being adjusted in SOC. In other words, in the steps after the self-discharge test S30, the percentage of the unsaturated carbonate is substantially constant until the start of actual use. Accordingly, for example, by collecting a battery immediately after shipment and measuring the percentage of the unsaturated carbonate in the nonaqueous electrolytic solution, the content ratio of the unsaturated carbonate during the self-discharge test can be approximately determined. As a specific procedure, first, a hole is formed on the top surface of the battery case in an inert atmosphere, and the nonaqueous electrolytic solution is collected through the hole. This electrolytic solution is analyzed using means such as a gas chromatography-mass spectrometer (GC-MS), a liquid chromatography-mass spectrometer (LC-MS), or ion chromatography (IC), to qualitatively and quantitatively analyze the unsaturated carbonate and chemical species derived from a decomposition product of the unsaturated carbonate. As a result, the percentage of the unsaturated carbonate during the self-discharge test S30 can be estimated.

Although it is not intended to limit the invention, a nonaqueous secondary battery according to an embodiment of the invention in which a flat wound electrode body and a nonaqueous electrolytic solution are accommodated in a flat rectangular battery case will be described as an example. In the following drawings, parts or portions having the same function are represented by the same reference numerals, and the repeated description will not be made or will be simplified. In each drawing, a dimensional relationship (for example, length, width, or thickness) does not necessarily reflect the actual dimensional relationship.

Figure 5:
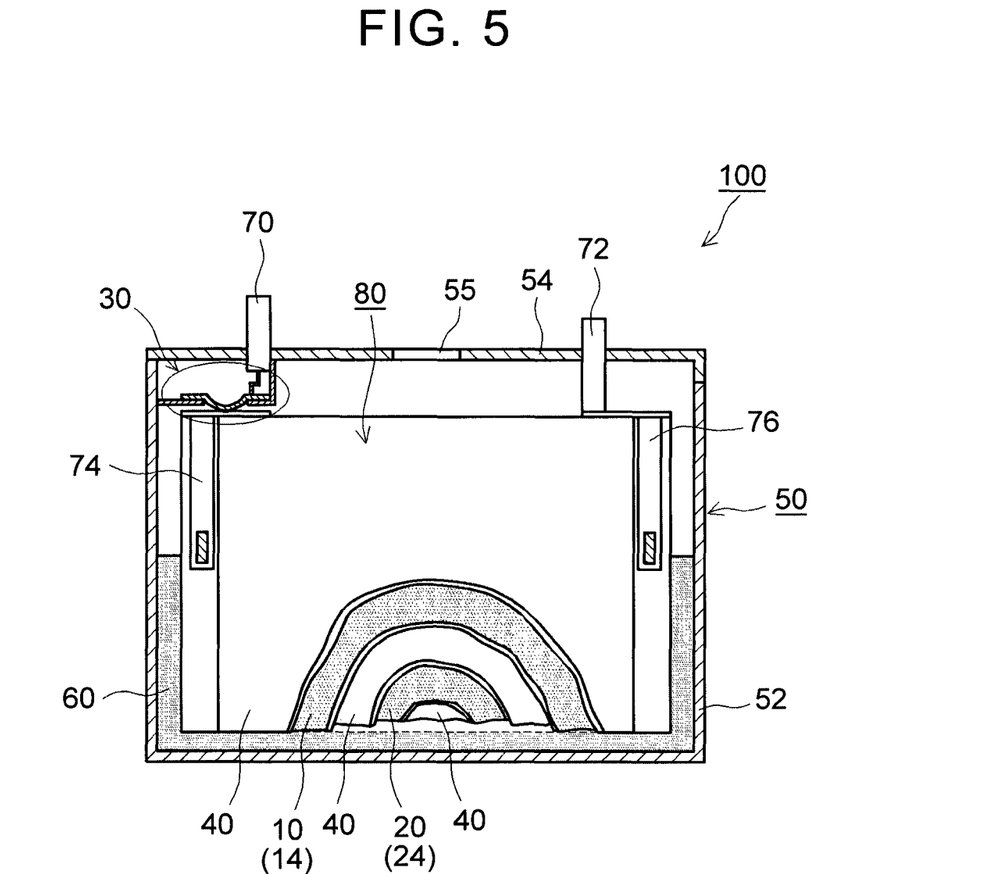
FIG. 5 is a cross-sectional view schematically showing a configuration of a nonaqueous secondary battery according to an embodiment of the invention.

FIG. 5 is a vertical cross-sectional view schematically showing a cross-sectional structure of a nonaqueous secondary battery 100. In this nonaqueous secondary battery 100, an electrode body (wound electrode body) 80 and a nonaqueous electrolytic solution 60 are accommodated in a flat box-shaped battery case 50, the electrode body 80 having a configuration in which an elongated positive electrode sheet 10 and an elongated negative electrode sheet 20 are wounded flat with an elongated separator sheet 40 interposed therebetween.

The battery case 50 includes: a flat rectangular (box shape) battery case body 52 having an open upper end; and a lid 54 that covers the opening. In a top surface (that is, the lid 54) of the battery case 50, a positive electrode terminal 70 for external connection, which is electrically connected to the positive electrode of the wound electrode body 80, and a negative electrode terminal 72, which is electrically connected to the negative electrode of the wound electrode body 80, are provided. As in the case of a battery case of a nonaqueous secondary battery in the related art, the lid 54 further includes a safety valve 55 for discharging gas, produced from the inside of the battery case 50, to the outside of the battery case 50. Further, in the battery case 50, a current interrupt device 30 that is operated due to an increase in the internal pressure of the battery case is provided between the positive electrode terminal 70, fixed to the lid 54, and the wound electrode body 80. When the internal pressure of the battery case 50 increases, the current interrupt device 30 interrupts a charging current by disconnecting a conductive path ranging from at least one of the electrode terminals (here, the positive electrode terminal 70) to the wound electrode body 80.

In the battery case 50, the flat wound electrode body 80 and the nonaqueous electrolytic solution 60 are accommodated. This wound electrode body 80 has an elongated sheet structure (sheet-shaped electrode body) in a step before assembly. The positive electrode sheet 10 includes a long positive electrode current collector; and a positive electrode active material layer 14 that is formed on at least one surface (typically, on both surfaces) in a longitudinal direction. The negative electrode sheet 20 includes a long negative electrode current collector; and a negative electrode active material layer 24 that is formed on at least one surface (typically, on both surfaces) in a longitudinal direction. In addition, two separators (separator sheets) 40 having an elongated sheet shape are arranged between the positive electrode active material layer 14 and the negative electrode active material layer 24 as an insulating layer for preventing direct contact therebetween.

A winding core portion is formed in the center of the wound electrode body 80 in a width direction which is defined as a direction from one end portion toward the other end portion in the winding axial direction. The winding core portion has a configuration in which the positive electrode active material layer 14 and the negative electrode active material layer 24 overlap each other to be densely laminated. The positive electrode active material layer 14 is formed on the surface of the positive electrode current collector, and the negative electrode active material layer 24 is formed on the surface of the negative electrode current collector. In addition, the positive electrode sheet 10 has a positive electrode active material layer non-forming portion at one end portion of the wound electrode body 80 in the winding axial direction. On the other hand, the negative electrode sheet 20 has a negative electrode active material layer non-forming portion at the other end portion of the wound electrode body 80 in the winding axial direction. The positive electrode active material layer non-forming portion is a portion at which the positive electrode active material layer is not formed. The negative electrode active material layer non-forming portion is a portion at which the negative electrode active material layer is not formed. The positive electrode active material layer non-forming portion and the negative electrode active material layer non-forming portion protrude from the winding core portion to the outside, respectively. A positive electrode current collector plate 74 is attached to the protrusion on the positive electrode side (that is, the positive electrode active material layer non-forming portion), and electrically connected to the positive electrode terminal 70. A negative electrode current collector plate 76 is attached to the protrusion on the negative electrode side (that is, the negative electrode active material layer non-forming portion), and electrically connected to the negative electrode terminal 72.

The nonaqueous secondary battery (typically, a lithium ion secondary battery) which is manufactured using the method disclosed herein can be used for various applications and can have high battery performance (for example, energy density and durability) and high reliability. Accordingly, due to the superior characteristics, the nonaqueous secondary battery can be suitably used as, for example, a power source (driving power supply) for a vehicle-mounted motor. The type of the vehicle is not particularly limited, but typical examples thereof include vehicles such as a plug-in hybrid vehicle (PHV), a hybrid vehicle (HV), and an electric vehicle (EV). Thus, as another embodiment of the invention, there can be provided a vehicle including any one of the nonaqueous secondary batteries (which may be in the form of a battery pack) disclosed herein.

Hereinafter, several examples relating to the invention will be described, but the specific examples are not intended to limit the invention. In these examples, the percentage of the unsaturated carbonate, the voltage drop amount ΔV, and the process load were investigated while changing the high-temperature aging time of the activation step (the start of the aging was set as 0 hours) in a range of 4 hours to 100 hours.

Construction of a battery assembly according to the examples of the invention is described below. $Li_{1.00}Ni_{0.38}Co_{0.32}Mn_{0.30}O_2$ powder as positive electrode active material powder; acetylene black (AB) as a conductive material; polyvinylidene fluoride (PVdF) as a binder were mixed with each other in N-methylpyrrolidone (NMP) to prepare a slurry composition. An elongated aluminum foil (positive electrode current collector) was coated with this composition to form a positive electrode active material layer on the aluminum foil. The obtained positive electrode was dried and pressed, and thus a sheet-shaped positive electrode (positive electrode sheet) was prepared. Next, carbon black powder as a negative electrode active material, styrene-butadiene rubber (SBR), and carboxymethyl cellulose (CMC) were mixed with each other in ion exchange water to prepare a slurry composition. An elongated copper foil (negative electrode current collector) was coated with this composition to form a negative electrode active material layer on the copper foil. The obtained negative electrode was dried and pressed, and thus a sheet-shaped negative electrode (negative electrode sheet) was prepared.

Next, a sheet including a resin substrate and a porous heat resistance layer was prepared as a separator sheet. The resin substrate has a three-layer structure in which a polypropylene (PP) layer was laminated on both surfaces of a polyethylene (PE) layer. The porous heat resistance layer contains alumina ($Al_2O_3$) as an inorganic material and an acrylic resin as a binder, and is formed on a single surface of the resin substrate. The positive electrode sheet and the negative electrode sheet prepared as above are laminated and wound with the separator sheet interposed therebetween. The obtained wound electrode body was squashed from the side surface thereof and formed into a flat shape. In the wound electrode body, a positive electrode terminal was joined to an end portion of the positive electrode current collector, and a negative electrode terminal was joined to an end portion of the negative electrode current collector.

This electrode body was accommodated in a square battery case, and a nonaqueous electrolytic solution was injected thereinto. As the nonaqueous electrolytic solution, a solution prepared using the following procedure was used. $LiPF_6$ as an electrolyte was dissolved in a mixed solvent at a concentration of about 1 mol/L, the mixed solvent containing ethylene carbonate (EC), dimethyl carbonate (DMC), and ethyl methyl carbonate (EMC) at a volume ratio (EC:DMC:EMC) of 30:40:30. Further, 1 mass % (with respect to the total amount of the nonaqueous electrolytic solution) of vinylene carbonate (VC), 0.3 mass % (with respect to the total amount of the nonaqueous electrolytic solution) of 2-butyne-1,4-diol dimethanesulfonate, and cyclohexylbenzene (CHB) and biphenyl (BP) as gas producing agents were added to the obtained solution. In this way, a battery assembly (capacity ratio (Initial Capacity of Negative Electrode/Initial Capacity of Positive Electrode): 1.36, rated capacity: 25 Ah) was constructed.

Next, the constructed battery assembly was charged at a constant current of 20 A until the voltage between the positive and negative electrode terminals reached 3.95 V. Further, the battery assembly was charged at the constant voltage of 3.95 V until the current reached 0.2 A (conditioning). Next, after the conditioning, the battery assembly was placed in a temperature-controlled thermostatic chamber to be heated to 60° C. and then was kept in a temperature environment of 60° C. while retaining the voltage at 3.95 V until the elapsed time from the start of the temperature increase was 4 hours to 100 hours (high-temperature aging). The conditioning and the high-temperature aging may be regarded as activation.

Measurement of a percentage of a sulfonic acid compound having a triple bond is described below. A small amount of nonaqueous electrolytic solution was collected from the battery assembly after high-temperature aging, followed by liquid-liquid extraction of a measurement object component (vinylene carbonate) using a mixed solution containing water and acetonitrile at a mass ratio of 1:1. After being diluted with acetone, the measurement object component was analyzed using GC-MS under conditions shown in Table 1 and was identified based on the keeping time using an MS spectrum (keeping time in a column). Although the details thereof are not shown, the keeping time of vinylene carbonate was 7.29 mins. The results are shown in Table 2.

TABLE 1

Measurement Conditions of GC-MS

| | |
|---|---|
| Device: | GC Device, G1350A (manufactured by Agilent Technologies Inc.) MS Device, JMS-AM II 15 (manufactured by JEOL Ltd.) |
| Vaporizing Chamber Temperature | 270° |
| Column Oven: | 50° C.→110° C. (5° C./min, 6 min)→250° C./min, 7 min)→300° C. |
| Temperature | (10° C./min, 20 min) |
| Ion Source Temperature | 200° C. |
| Interface Temperature | 200° C. |
| Split Ratio: | 50 |
| Column | HP-1 (Length: 60 m, Inner Diameter: 0.32 mm, Thickness: 1 μm) |
| Injection Amount | 0.5 μL (Sample Solution was Diluted 200-Fold Times With Acetone) |

Figure 6:
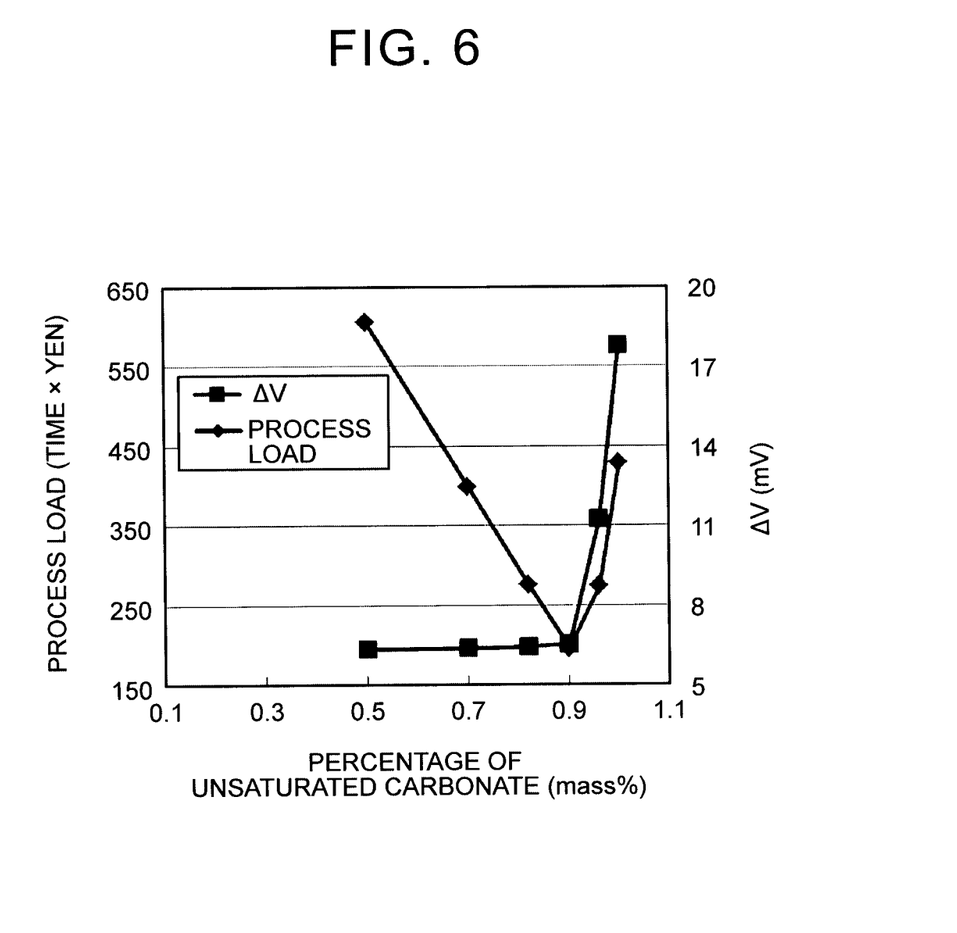
FIG. 6 is a graph showing a relationship between a percentage of an unsaturated carbonate in a nonaqueous electrolytic solution, and a process load and a voltage drop amount $\Delta V$.

A quality inspection regarding each example is described below. Next, the battery assembly was discharged at a constant current of 60 A until the voltage between the positive and negative electrode terminals reached 2.0 V, and the interval capacity and the IV resistance thereof were measured. Next, after being adjusted to 3.3 V (SOC of 3%), the battery assembly was self-discharged by being left to stand for 10 days. The voltage drop amount ΔV was calculated by subtracting a voltage value after the self-discharge from a voltage value before the self-discharge. The results are shown in Table 2. In addition, FIG. 6 shows a relationship between the percentage of the unsaturated carbonate and the voltage drop amount ΔV. In addition, the process load was calculated from the product obtained by multiplying the time required in the high-temperature aging step by the self-discharge test step; and the cost per unit time in each step. The results are shown in Table 2. In addition, FIG. 6 shows a relationship between the process load and the voltage drop amount ΔV.

TABLE 2

| | High-Temperature Aging Time (Hr) | Percentage of VC in Electrolytic Solution (mass %) | Voltage Drop Amount ΔV (mV) | Process Load (Time × Yen) |
|---|---|---|---|---|
| Example 1 | 0 | 1.0 | 17.79 | 429 |
| Example 2 | 4 | 0.95 | 11.25 | 274 |

TABLE 2-continued

| | High-Temperature Aging Time (Hr) | Percentage of VC in Electrolytic Solution (mass %) | Voltage Drop Amount ΔV (mV) | Process Load (Time × Yen) |
|---|---|---|---|---|
| Example 3 | 17 | 0.9 | 6.55 | 196 |
| Example 4 | 34 | 0.82 | 6.44 | 275 |
| Example 5 | 60 | 0.7 | 6.4 | 399 |
| Example 6 | 100 | 0.5 | 6.35 | 605 |

As shown in Table 2, the percentage of the unsaturated carbonate remaining in the nonaqueous electrolytic solution can be accurately controlled by adjusting the high-temperature aging time. In the examples shown herein, by performing high-temperature aging in an environment of a temperature of 60° C. and a voltage of 3.95 V for 17 hours or longer (for example, 17 hours to 100 hours), the percentage of VC in the nonaqueous electrolytic solution can be adjusted to be 0.9 mass % or less (for example, 0.5 mass % to 0.9 mass %). In addition, as shown in Table 2 and FIG. 6, by performing the self-discharge test in a state where the percentage of the unsaturated carbonate in the nonaqueous electrolytic solution was adjusted to be 0.9 mass % or less, the voltage drop amount ΔV (absolute value) of a good product can be reduced to be 10 mV or lower (preferably 6.55 mV or lower). As a result, whether a product is good or bad is easy to be determined, and a highly reliable battery can be stably manufactured within a shorter period of time as compared to that in the related art.

Under the same temperature conditions and voltage conditions in the activation, as the percentage of the unsaturated carbonate in the nonaqueous electrolytic solution decreases, the time required in the activation is likely to increase. In particular, in the high-temperature aging step, the battery assembly is kept in the high-temperature range, and thus the cost per unit time is high. From this point of view, it is preferable that the high-temperature aging is completed within a short period of time. Therefore, as shown in Table 2 and FIG. 6, in consideration of the process load (required time×cost per unit time) of the high-temperature aging step and the self-discharge test step, for example, in the above-described examples, the high-temperature aging time was set to be 60 hours or shorter (in particular, 34 hours or shorter). As a result, the percentage of the unsaturated carbonate in the nonaqueous electrolytic solution was adjusted to be 0.7 mass % or more (0.8 mass % or more). It is preferable that the self-discharge test was performed in the above state.

Hereinabove, specific examples of the invention have been described in detail. However, these examples are merely exemplary and do not limit the invention. The invention includes various modifications and alternations of the above-described specific examples.

What is claimed is:
1. A method of manufacturing a nonaqueous secondary battery, the method comprising:
constructing a battery assembly with a positive electrode, a negative electrode, and a nonaqueous electrolytic solution, the nonaqueous electrolytic solution containing an unsaturated carbonate;
activating the battery assembly to decompose a portion of the unsaturated carbonate such that a percentage of the unsaturated carbonate is adjusted to be within a range of 0.5 mass % to 0.9 mass % with respect to 100 mass % of a total amount of the nonaqueous electrolytic solution;

self-discharging the battery assembly to measure a voltage drop amount; and determining whether internal short-circuit occurs in the battery assembly based on the voltage drop amount.

2. The method according to claim 1, wherein
the percentage of the unsaturated carbonate in the nonaqueous electrolytic solution is adjusted to be 0.7 mass % or more by the activating.

3. The method according to claim 1, wherein
the percentage of the unsaturated carbonate in the nonaqueous electrolytic solution is adjusted to be 0.8 mass % or more by the activating.

4. The method according to claim 1, wherein
the activating includes
   conditioning in which the battery assembly is initially charged, and
   aging in which the battery assembly is kept in a temperature environment of 40° C. or higher, and
the aging includes adjusting the percentage of the unsaturated carbonate in the nonaqueous electrolytic solution by controlling a time to keep the battery assembly in the temperature environment.

5. The method according to claim 1, wherein
the nonaqueous electrolytic solution that is used in the constructing contains 1 mass % or more of the unsaturated carbonate.

6. The method according to claim 1, wherein
the unsaturated carbonate includes at least a vinylene carbonate compound.

\* \* \* \* \*